(12) United States Patent
Park

(10) Patent No.: US 11,447,009 B2
(45) Date of Patent: Sep. 20, 2022

(54) VEHICULAR INFOTAINMENT APPARATUS, METHOD OF CONTROLLING THE SAME, AND VEHICLE INCLUDING THE SAME

(71) Applicants: Hyundai Motor Company, Seoul (KR); Kia Motors Corporation, Seoul (KR)

(72) Inventor: Sung Joon Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 630 days.

(21) Appl. No.: 16/538,284

(22) Filed: Aug. 12, 2019

(65) Prior Publication Data

US 2020/0238824 A1 Jul. 30, 2020

(30) Foreign Application Priority Data

Jan. 29, 2019 (KR) .................. 10-2019-0011193

(51) Int. Cl.
*B60K 35/00* (2006.01)
*G06F 3/01* (2006.01)
*B60R 11/02* (2006.01)
*G06V 20/59* (2022.01)
*G06V 40/19* (2022.01)

(52) U.S. Cl.
CPC .......... *B60K 35/00* (2013.01); *B60R 11/0235* (2013.01); *G06F 3/013* (2013.01); *G06V 20/597* (2022.01); *G06V 40/19* (2022.01); *B60K 2370/164* (2019.05); *B60K 2370/349* (2019.05); *B60K 2370/736* (2019.05); *B60K 2370/744* (2019.05)

(58) Field of Classification Search
CPC ...... B60K 35/00; G06V 20/597; G06V 40/19; B60R 11/0235; G06F 3/013
See application file for complete search history.

(56) References Cited

U.S. PATENT DOCUMENTS 10,061,186 B2 * 8/2018 Kong ................ B60R 1/12
2010/0238280 A1 * 9/2010 Ishii ................ G02B 27/01
348/77

(Continued)

FOREIGN PATENT DOCUMENTS

KR 101834453 B1 3/2018

*Primary Examiner* — David E Choi
(74) *Attorney, Agent, or Firm* — Fox Rothschild LLP

(57) ABSTRACT

A vehicular infotainment apparatus may include: a display unit configured to display information on a screen; a projection unit disposed proximate to the screen of the display unit, the projection unit being rotatable, movable, and configured to project the information displayed on the screen of the display unit; a driver configured to rotate and move the projection unit; and a controller configured to control operation of the display unit and the driver and to receive a request for rotation of the projection unit. The controller may be further configured to control the driver such that the driver causes the projection unit to rotate or move at a rotation angle corresponding to the request for rotation of the projection unit and to control the display unit such that the display unit modifies the information displayed on the screen of the display unit according to the rotation angle.

20 Claims, 9 Drawing Sheets

(56) References Cited

U.S. PATENT DOCUMENTS

| | | | |
|---|---|---|---|
| 2015/0363070 A1* | 12/2015 | Katz | G06F 3/0482 |
| | | | 715/852 |
| 2018/0011313 A1* | 1/2018 | Nah | B60K 35/00 |
| 2018/0041753 A1* | 2/2018 | Hoggarth | B60K 35/00 |
| 2018/0335626 A1* | 11/2018 | Ji | G02B 27/0179 |
| 2018/0335627 A1* | 11/2018 | Fujita | G02B 27/01 |
| 2019/0025580 A1* | 1/2019 | Nagano | B60K 35/00 |
| 2020/0142495 A1* | 5/2020 | Steinberg | G06V 40/18 |
| 2020/0376961 A1* | 12/2020 | Kleen | B60W 40/02 |
| 2021/0080718 A1* | 3/2021 | Sato | G02B 27/0101 |
| 2021/0132381 A1* | 5/2021 | You | G02B 7/1827 |
| 2021/0291657 A1* | 9/2021 | Kuh | G06F 3/14 |

* cited by examiner

ROTATION AND MOVEMENT

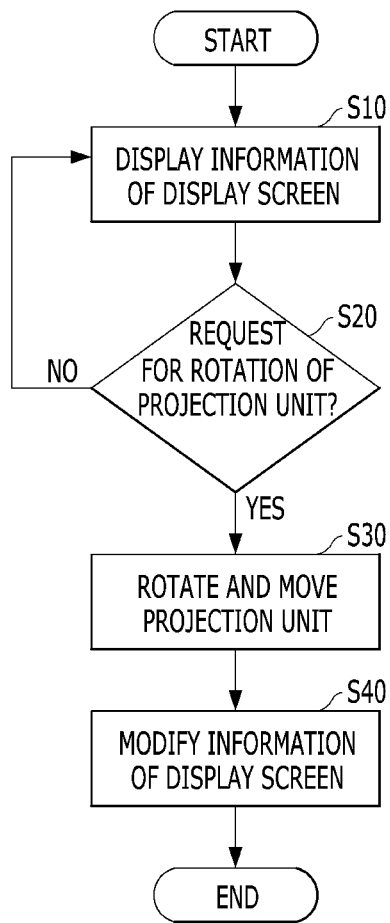

VEHICULAR INFOTAINMENT APPARATUS, METHOD OF CONTROLLING THE SAME, AND VEHICLE INCLUDING THE SAME

CROSS-REFERENCE TO RELATED APPLICATION

This application claims the benefit of priority to Korean Patent Application No. 10-2019-0011193, filed on Jan. 29, 2019, which is hereby incorporated by reference as if fully set forth herein.

BACKGROUND

Technical Field

The present disclosure relates to a vehicular infotainment apparatus, and more particularly, to a vehicular infotainment apparatus, a method of controlling the same, and a vehicle including the same, for projecting a display screen to facilitate recognition and input for the driver.

Discussion of the Related Art

A vehicular infotainment apparatus can be formed by integrating information, such as road guidance information, and entertainment. In general, the vehicular infotainment apparatus is installed in or above the center fascia of a vehicle. The vehicular infotainment apparatus can provide various pieces of information to a driver through a display screen.

However, the display screen of the infotainment apparatus is often installed without consideration of the driver's eye point. Thus, it is inconvenient for the driver to interact with the display screen or check information provided on the display screen. For example, the display screen can be outside of the visual field of the driver, thereby diminishing visibility, especially in medium- or large-sized vehicles. Furthermore, it can be difficult for smaller drivers to reach the display to provide touch input.

In conventional cases, the infotainment apparatus has been installed based on a viewing angle of the driver to improve visibility thereof and the ability for drivers to provide touch input. However, because the infotainment apparatus is positioned only to provide convenience to the driver, the same benefits are not provided to front and rear passengers of the vehicle.

SUMMARY

Accordingly, the present disclosure is directed to a vehicular infotainment apparatus, a method of controlling the same, and a vehicle including the same that substantially obviates one or more problems due to limitations and disadvantages of the related art.

An object of the present disclosure is to provide a vehicular infotainment apparatus, a method of controlling the same, and a vehicle including the same, for modifying information displayed on a display screen depending on a rotation angle of a projection unit that has been rotated and/or moved and for projecting a display screen in a direction toward the driver to facilitate recognition and the ability to provide touch input.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a vehicular infotainment apparatus may include: a display unit configured to display information on a screen; a projection unit disposed proximate to the screen of the display unit, the projection unit being rotatable, movable, and configured to project the information displayed on the screen of the display unit; a driver configured to rotate and move the projection unit; and a controller configured to control operation of the display unit and the driver and to receive a request for rotation of the projection unit, wherein the controller is further configured to control the operation of the driver such that the driver causes the projection unit to rotate or move at a rotation angle corresponding to the request for rotation of the projection unit and to control the operation of the display unit such that the display unit modifies the information displayed on the screen of the display unit according to the rotation angle of the projection unit.

Furthermore, according to embodiments of the present disclosure, a method of controlling a vehicular infotainment apparatus including a projection unit disposed proximate to a screen of a display unit that is rotatable, movable, and configured to project information displayed on the screen of the display unit may include: displaying information on the screen of the display unit; receiving, by a controller, a request for rotation of the projection unit; upon receiving the request for rotation of the projection unit, controlling, by the controller, operation of a driver such that the driver causes the projection unit to rotate or move at a rotation angle corresponding to the request for rotation of the projection unit; and controlling, by the controller, operation of the display unit such that the display unit modifies the information displayed on the screen of the display unit according to the rotation angle of the projection unit.

Furthermore, according to embodiments of the present disclosure, a computer readable recording medium may have recorded thereon a program for executing the above method of controlling the vehicular infotainment apparatus.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 14 is a flowchart for explanation of a method of controlling a vehicular infotainment apparatus according to embodiments of the present disclosure.

Figure 1:
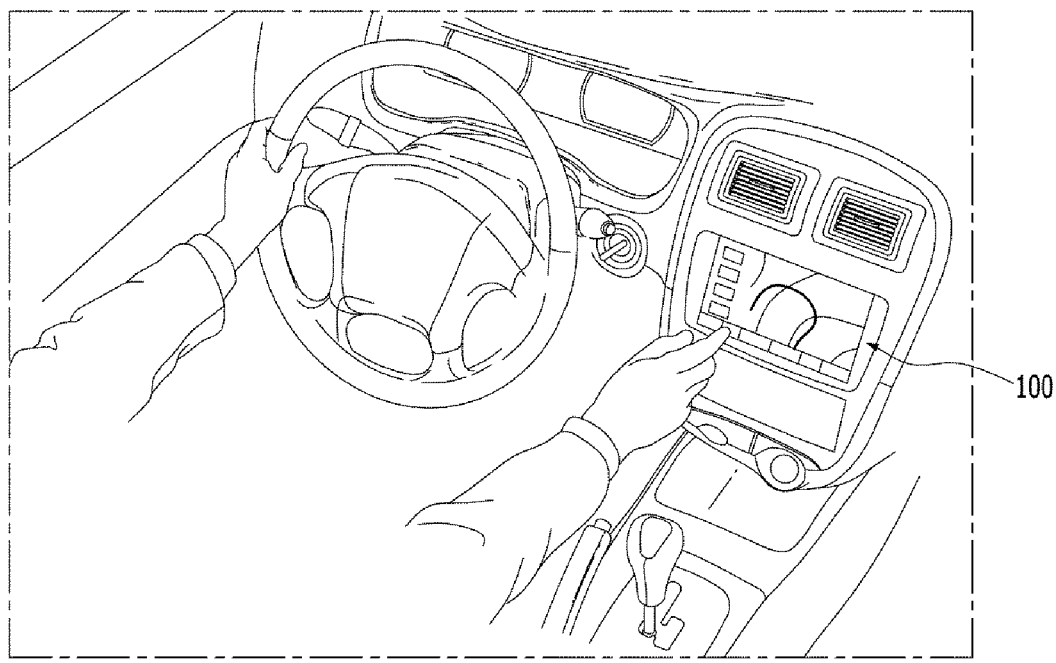
FIGS. 1 and 2 are diagrams showing a vehicle including an infotainment apparatus according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Exemplary embodiments of the present disclosure are described in detail so as for those of ordinary skill in the art to easily implement the disclosure with reference to the accompanying drawings. However, the present disclosure may be implemented in various different forms and is not limited to these embodiments. To clearly describe the present disclosure, parts unrelated to the description are omitted in the drawings and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Hereinafter, a vehicular infotainment apparatus, a method of controlling the same, and a vehicle including the same, applicable to embodiments of the present disclosure, are described in detail with reference to FIGS. 1 to 12.

Figure 2:
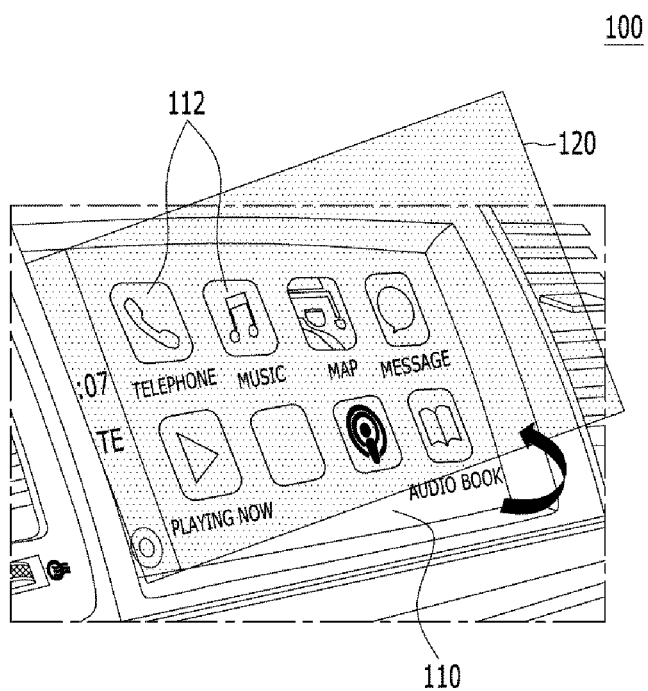

FIGS. 1 and 2 are diagrams showing a vehicle including an infotainment apparatus according to embodiments of the present disclosure.

As shown in FIGS. 1 and 2, according to the present disclosure, a touch panel that is a projection unit 120 of an infotainment apparatus 100 installed in a vehicle may be rotatably configured in a direction toward a driver, and when an application icon 112 output to a screen of a display unit 110 of the infotainment apparatus 100 is projected onto the touch panel of the rotated projection unit 120, the application icon projected to the touch panel that is the projection unit 120 may be pushed to execute a corresponding application.

To this end, according to the present disclosure, application recognition coordinates of the touch panel needs to be changed depending on a rotation angle of the touch panel that is the projection unit 120, and an image ratio of the application icon 112 displayed on the screen of the display unit 110 of the infotainment apparatus 100 needs to be adjusted to normally display an application icon projected onto the touch panel even if the touch panel is rotated.

According to the present disclosure, an icon image projected onto the touch panel may be stereoscopically displayed through a stereoscopic effect applied to an image of the application icon 112 displayed on the screen of the display unit 110 of the infotainment apparatus 100.

Figure 3:
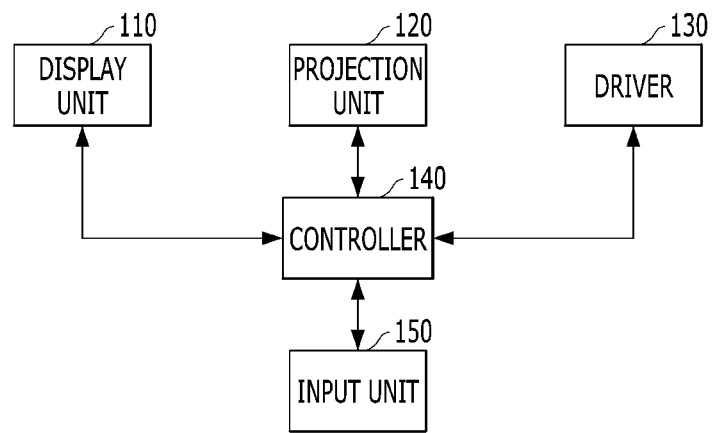
FIG. 3 is a block diagram showing the configuration of a vehicular infotainment apparatus according to embodiments of the present disclosure.
Figure 4:
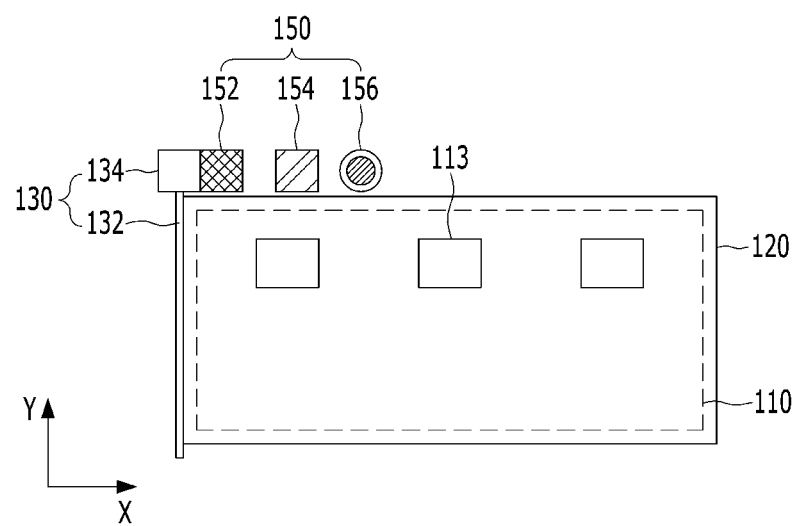
FIG. 4 is a diagram for explanation of a vehicular infotainment apparatus according to embodiments of the present disclosure.

FIG. 3 is a block diagram showing the configuration of a vehicular infotainment apparatus according to embodiments of the present disclosure. FIG. 4 is a diagram for explanation of a vehicular infotainment apparatus according to embodiments of the present disclosure.

As shown in FIGS. 3 and 4, the infotainment apparatus according to the present disclosure may include the display unit 110 for displaying information 113 on the screen, the projection unit 120 that is distributed on the screen of the display unit 110, is rotated and moved, and projects the information 113 displayed on the screen of the display unit 110, a driver 130 for rotating the projection unit 120, and a controller 140 for controlling the display unit 110 and the driver 130.

According to the present disclosure, the infotainment apparatus may further include an input unit 150 for inputting information input from a user or the outside.

Here, the input unit 150 may include a rotation angle sensor 152 for sensing a rotation angle of the projection unit 120, a gesture sensor 154 for sensing a gesture of a user, and a camera 156 for photographing a user face, but the present disclosure is not limited thereto.

The controller 140 may control the driver 130 to rotate and move the projection unit 120 at a rotation angle corresponding to user input upon receiving the user input for requesting rotation of the projection unit 120, and may control the display unit 110 to modify information displayed on the screen of the display unit 110 according to the rotation angle of the projection unit 120 that is rotated and moved.

Then, the display unit 110 may display various pieces of information on the screen.

Here, the information 113 displayed on the screen may include an application icon, but the present disclosure is not limited thereto.

The projection unit 120 may be distributed on the screen of the display unit 110, may be rotated and moved, and may project the information 113 displayed on the screen of the display unit 110.

Here, the projection unit 120 may be a transparent touch panel, but is not limited thereto.

As necessary, the projection unit 120 may have a larger area than an area of the screen of the display unit 110.

This is because it is possible to project all pieces of the information 113 displayed on the screen of the display unit 110 onto the transparent touch panel that is the projection unit 120.

Then, the driver 130 may drive the projection unit 120.

For example, the driver 130 may include a rotation hinge 132 that is hinged to one side of the projection unit 120 and rotates the projection unit 120, and a motor 134 for rotating the rotation hinge 132 according to a control signal of the controller 140.

Here, the rotation hinge 132 may be disposed at one side of the screen of the display unit 110 in the Y-axis direction based on the screen of the display unit 110, but the present disclosure is not limited thereto.

The motor 134 may be a step motor, but is not limited thereto.

The input unit 150 may include the rotation angle sensor 152 for sensing a rotation angle of the projection unit 120.

Here, the rotation angle sensor 152 may sense a rotation angle of the projection unit 120 at a predetermined time interval while the projection unit 120 is rotated and moved.

As necessary, the rotation angle sensor 152 may also sense the rotation angle of the projection unit 120 at a time point at which the projection unit 120 stops rotating and moving during rotation and movement.

The controller 140 may control the display unit 110 to modify the information 113 displayed on the screen of the display unit 110 based on the rotation angle received from the rotation angle sensor 152.

Here, the modified information 113 may include an application icon, but the present disclosure is not limited thereto.

That is, the controller 140 may control the display unit 110 to modify at least one of the coordinates and size of the information 113, and the size of a touch region corresponding to the information 113, but the present disclosure is not limited thereto.

For example, when the information 113 is an application icon, the display unit 110 may change coordinates of an application icon, the size of the application icon, or the size of the touch region of the application icon, depending on the rotation angle of the projection unit 120 according to a control signal of the controller 140.

As necessary, the display unit 110 may simultaneously change the coordinates of the application icon, the size of the application icon, and the size of the touch region of the application icon, depending on the rotation angle of the projection unit 120 according to the control signal of the controller 140.

The controller 140 may control the display unit 110 to increase at least one of the size of the information 113 and the size of the touch region corresponding to the information 113 along with an increase in the rotation angle.

That is, the display unit 110 may change and increase at least one of the coordinates of the application icon, the size of the application icon, and the size of the touch region of the application icon when the rotation angle of the projection unit 120 is increased according to the control signal of the controller 140.

This is because an application icon formed by projecting the application icon displayed on the screen of the display unit 110 onto the transparent touch panel that is the projection unit 120 is not a normal image when the rotation angle of the projection unit 120 is increased in a direction toward a driver or a user.

Accordingly, the display unit 110 may modify the size of the application icon, the size of the touch region of the application icon, and the like depending on the rotation angle of the projection unit 120 to display the application icon projected onto the transparent touch panel that is the projection unit 120 as a normal image.

For example, when a rotation axis of the projection unit 120 is the Y axis, the controller 140 may control the display unit to fix the size of the application icon in the Y-axis direction or the size of the touch region of the application icon based on the screen of the display unit 110, and to increase the size of the application icon or the size of the touch region of the application icon in the X-axis direction.

In this case, the application icon projected onto the transparent touch panel that is the projection unit 120 may be displayed as a normal image using a visual field of a driver or a user.

As such, the controller 140 may control the display unit 110 to increase or reduce the size of the application icon in the X-axis direction by a ratio of $1/\cos\theta$ depending on the rotation angle of the projection unit 120.

For example, when the rotation hinge 132 is rotated, a relationship between coordinates X, Y of the application icon displayed on the screen of the display unit 110 and coordinates X', Y' of the application icon projected onto the transparent touch panel that is the projection unit 120 may satisfy $X*\cos\theta = X'$ and $Y = Y'$.

That is, it may be possible to change the touch region of the application icon depending on the rotation angle of the projection unit 120 according to the transformation matrix $$T = \begin{pmatrix} \cos\theta & 0 \\ 0 & 1 \end{pmatrix}.$$

Accordingly, a relationship between coordinates X, Y of the application icon displayed on the screen of the display unit 110 and coordinates X', Y' of the application icon projected onto the transparent touch panel that is the projection unit 120 may satisfy the following expression.

$$\begin{pmatrix} X' \\ Y' \end{pmatrix} = T \begin{pmatrix} X \\ Y \end{pmatrix}$$

In addition, when the X-axis line of the application icon displayed on the screen of the display unit 110 extends in a magnification of $1/\cos\theta$ depending on the rotation angle of the projection unit 120, component D is 1 in asymptotic matrix P×projection matrix T to check a normal image, according to the following expressions.

$$P = \begin{pmatrix} 1/\cos\theta & 0 \\ 0 & 1 \end{pmatrix},$$

$$T = \begin{pmatrix} \cos\theta & 0 \\ 0 & 1 \end{pmatrix}$$

$$P \times T = \begin{pmatrix} 1 & 0 \\ 0 & 1 \end{pmatrix}$$

Here, when the X-axis line of the result value of P×T extends in a magnification of 1/cosθ, it may be possible to display an image of an application icon projected onto the transparent touch panel that is the projection unit 120 as a normal image.

When the transparent touch panel that is the projection unit 120 is rotated based on the Y axis only, the size and touch region of the application icon may be determined according to a value of cosθ.

When the transparent touch panel that is the projection unit 120 is rotated based on the Y axis only, a vertical distance D2 between an application icon B and a screen of the transparent touch panel that is the projection unit 120 may be greater than a vertical distance D1 between an application icon A and the screen of the transparent touch panel that is the projection unit 120 based on a distance by which the application icon A and the application icon B displayed on the display unit 110 are spaced from the center, and thus, brightness of the projection application icon B may be darker than the brightness of the projection application icon A.

Accordingly, according to the present disclosure, the brightness of the application icons displayed on the screen of the display unit 110 may be appropriately adjusted to the changed projection distance depending on the rotation angle of the projection unit 120, thereby removing sense of difference.

That is, the controller 140 may control the display unit 110 to display the application icon A and the application icon B in such a way that the brightness of the application icon B displayed on the screen of the display unit 110 is lighter than the brightness of the application icon A.

As such, when controlling the display unit to modify the information 113 displayed on the screen of the display unit 110, the controller 140 may control the display unit 110 to adjust the brightness of the information 113 based on the rotation angle of the projection unit 120 and a distance between a rotation axis of the projection unit 120 and the information 113.

Here, when adjusting the brightness of the information 113, the controller 140 may control the display unit 110 to increase the brightness of the information 113 along with an increase in the rotation angle and an increase in the distance between the rotation axis of the projection unit 120 and the information 113.

The controller 140 may control the display unit 110 to adjust the brightness of the information 113 based on the rotation angle received from the rotation angle sensor 152.

Here, the controller 140 may control the display unit 110 to increase the brightness of the information 113 along with an increase in the rotation angle.

The input unit 150 may include the gesture sensor 154 for sensing a gesture of a driver or a user.

Here, the controller 140 may control the driver 130 to rotate and move the projection unit 120 based on gesture information received from the gesture sensor 154.

When the gesture information received from the gesture sensor 154 is a request for rotation of the projection unit 120, the controller 140 may control the driver 130 to rotate and move the projection unit 120, and upon receiving a request for stop of rotation of the projection unit 120, the controller 140 may control the driver 130 to stop rotation and movement of the projection unit 120.

Here, when controlling the driver 130 to stop rotation and movement of the projection unit 120, the controller 140 may control the driver 130 to stop rotation and movement of the projection unit 120 when the screen of the projection unit 120 contacts a predetermined object during rotation and movement of the projection unit 120.

For example, the predetermined object may be a user body, but is not limited thereto.

That is, upon recognizing a hand shape as gesture information indicating a request for rotation of the projection unit 120 through the gesture sensor 154, the controller 140 may control the step motor that is the driver 130 to rotate the transparent touch panel that is the projection unit 120, and may control the step motor that is the driver 130 to stop rotation of the projection unit 120 when the transparent touch panel that is the projection unit 120 contacts a finger of the driver.

As such, according to the present disclosure, the transparent touch panel that is the projection unit 120 may be rotated only to a position at which the driver finger is positioned, and thus, user convenience may be provided to easily and conveniently control the rotation angle of the projection unit 120.

As necessary, when controlling the driver 130 to stop rotation and movement of the projection unit 120, the controller 140 may control the driver 130 to stop rotation and movement of the projection unit 120 when gesture information received from the gesture sensor 154 is a request for stop of rotation of the projection unit 120.

That is, upon recognizing a hand shape as gesture information indicating a request for rotation of the projection unit 120 through the gesture sensor 154, the controller 140 may control the step motor that is the driver 130 to rotate the transparent touch panel that is the projection unit 120, and upon recognizing a hand shape as gesture information indicating stop of rotation of the projection unit 120 through the gesture sensor 154, the controller 140 may control the step motor that is the driver 130 to stop rotation of the projection unit 120.

As such, according to the present disclosure, the transparent touch panel that is the projection unit 120 may be rotated only to an eye point for recognizing gesture information indicating stop of rotation of the projection unit 120, and thus, user convenience may be provided to easily and conveniently control the rotation angle of the projection unit 120.

The input unit 150 may include the camera 156 for photographing a user face.

Here, the controller 140 may control the display unit 110 to extract a user pupil from a user face image captured by the camera 156 and to modify a shape of the information 113 based on a position change in the extracted user pupil.

As such, according to the present disclosure, a shape of an application icon may be modified according to a change in an eye point of a driver.

That is, the controller 140 may detect a position change in a pupil from a driver face through a gesture sensor 154 or the camera 156, and may modify the application icon to stereoscopically display the application icon appropriately to a driver eye point for viewing the application icon projected onto the transparent touch panel that is the projection unit 120 or may modify the application icon to be displayed in a circular shape.

According to the present disclosure, the application icon displayed on the screen of the display unit 110 may be distorted according to a driver eye point to implement a function of causing an optical illusion whereby an application icon projected onto the projection unit 120 is stereoscopically moved according to a change in a driver eye point.

As such, the present disclosure may be implemented using the projection matrix and the eye point transformation matrix for 3D graphic processing in order to differently modify a degree by which the projected application icon is distorted according to the driver eye point.

Upon receiving user input of a request for rotation of the projection unit 120, the controller 140 may receive user input from an input switch installed at a steering wheel of a vehicle.

For example, the input switch may be a wheel type switch or an up/down switch, but is not limited thereto.

In addition, when the input switch is the wheel type switch, the controller 140 may recognize the rotation angle of the projection unit 120 depending on a rotation amount of the wheel type switch.

As necessary, upon receiving user input of a request for rotation of the projection unit 120, the controller 140 may also receive user input from the gesture sensor 154 of the vehicle.

Then, when controlling the driver 130 to rotate and move the projection unit 120, the controller 140 may extract rotation angle information from the user input and may control the driver 130 based on the extracted rotation angle information.

Then, when controlling the display unit 110 to modify information displayed on the screen of the display unit 110, the controller 140 may control the display unit 110 to modify at least one of the coordinates and size of the information 113, and size of a touch region corresponding to the information 113.

Here, when modifying at least one of the coordinates and size of the information 113, and the size of the touch region corresponding to the information 113, the controller 140 may control the display unit 110 to increase at least one of the size of the information 113 and the size of the touch region corresponding to the information 113 when the rotation angle of the projection unit 120 is increased.

For example, when modifying at least one of the coordinates and size of the information 113 and the resize of the touch region corresponding to the information 113, the controller 140 may control the display unit 110 to fix the size in the Y-axis direction based on the screen of the display unit 110 and to increase the size in the X-axis direction when the rotation of the projection unit 120 is the Y axis and the rotation angle of the projection unit 120 is increased.

That is, when modifying at least one of the coordinates and size of the information 113 and the size of the touch region corresponding to the information 113, the controller 140 may control the display unit 110 to increase the size in the X-axis direction in a magnification of $1/\cos\theta$ when the rotation axis of the projection unit 120 is the Y axis and the rotation angle of the projection unit 120 is increased.

As such, according to the present disclosure, on the transparent touch panel that is the projection unit 120 onto which the application icon displayed on the screen of the display unit 110 is projected, the Y-axis direction line of the projection application icon may be fixed, but the X-axis direction line of the projection application icon may be reduced when the rotation hinge 132 is rotated, and thus, a different shape from an actual application displayed on the screen of the display unit 110 may be displayed.

To correct this, according to the present disclosure, the X-axis line of the application icon displayed on the screen of the display unit 110 may extend in a magnification corresponding to the rotation angle in order to normally recognize the projection application icon, which is formed by projecting the application icon displayed on the screen of the display unit 110 onto the screen by the driver, depending on the rotation angle of the projection unit 120.

When controlling the display unit 110 to modify the information 113 displayed on the screen of the display unit 110, the controller 140 may control the display unit 110 to adjust the brightness of the information 113 displayed on the screen of the display unit 110 based on the rotation angle of the projection unit 120.

Here, when adjusting the brightness of the information 113, the controller 140 may control the display unit 110 to increase the brightness of the information 113 displayed on the screen of the display unit 110 when the rotation angle of the projection unit 120 is increased.

As necessary, when controlling the display unit 110 to modify information displayed on the screen of the display unit 110, the controller 140 may control the display unit 110 to adjust the brightness of the information 113 displayed on the screen of the display unit 110 based on the rotation angle of the projection unit 120, and a distance between the rotation axis of the projection unit 120 and the information 113 displayed on the screen of the display unit 110.

Here, when adjusting the brightness of the information 113 displayed on the screen of the display unit 110, the controller 140 may control the display unit 110 to increase the brightness of the information 113 displayed on the screen of the display unit 110 along with an increase in the rotation of the projection unit 120 and an increase in a distance between the rotation axis of the projection unit and the information 113 displayed on the screen of the display unit 110.

When controlling the display unit 110 to modify the information 113 displayed on the screen of the display unit 110, the controller 140 may control the display unit 110 to adjust a stereoscopic effect of the information 113 displayed on the screen of the display unit 110 based on the rotation angle of the projection unit 120.

Here, when adjusting the stereoscopic effect of the information 113, the controller 140 may control the display unit 110 to increase the stereoscopic effect of the information 113 displayed on the screen of the display unit 110 when the rotation angle of the projection unit 120 is increased.

As such, according to the present disclosure, a degree of a stereoscopic effect applied to an application icon displayed on the screen of the display unit 110 of the infotainment apparatus may be changed depending on the rotation angle of the projection unit 120, and thus, the projection application icon that is projected onto the screen of the transparent touch panel that is the projection unit 120 may be stereoscopically displayed like 3D effect advertisement.

When controlling the display unit 110 to modify information displayed on the screen of the display unit 110, the controller 140 may control the display unit 110 to modify a shape of the information 113 displayed on the screen of the display unit 110 based on a position change of a user pupil.

As such, according to the present disclosure, information displayed on the display screen may be modified depending on the rotation angle of the projection unit that is rotated and moved, and thus, the information of the display screen may be projected in a direction toward a driver to enable easy recognition and touch.

According to the present disclosure, an undersized driver may easily execute an application of an infotainment screen during driving.

According to the present disclosure, the application icon may be stereoscopically displayed to enhance visibility, and a customer commercial value may be enhanced in terms of a stereoscopic icon design.

As such, the present disclosure relates to a method of rotating a capacitive touchpad panel depending on a viewing angle of a driver and executing an application when an application image of an infotainment apparatus, projected onto the touchpad panel, is touched.

That is, according to the present disclosure, when the transparent touch panel that is the projection unit of the screen of the infotainment apparatus is rotated by a driver through a step motor or a motor via a switch operation, an icon that is formed by extending the X-axis line of an icon displayed on the screen of the infotainment apparatus in a magnification of $1/\cos\theta$ depending on a rotation angle measured through an angle sensor and is projected onto the transparent touch panel may be normally displayed.

According to the present disclosure, an icon touch region of the touch panel may also be changed according to the projection matrix depending on the rotation angle of the touch panel, and thus, when the driver touches an icon image region recognized by the driver, an application may be executed.

According to the present disclosure, a degree of a stereoscopic effect applied to an application icon displayed on the infotainment apparatus may be changed depending on the rotation angle of the transparent touch panel that is the projection unit, and thus, the icon may be stereoscopically displayed along with rotation of the transparent touch panel.

Figure 5:
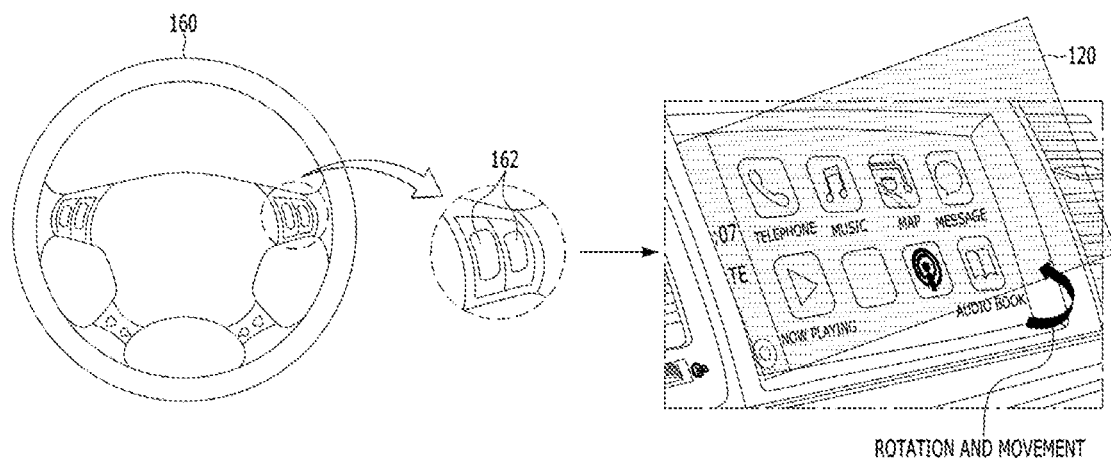
FIGS. 5 and 6 are diagrams for explanation of user input for driving of rotation of a projection unit.
Figure 6:
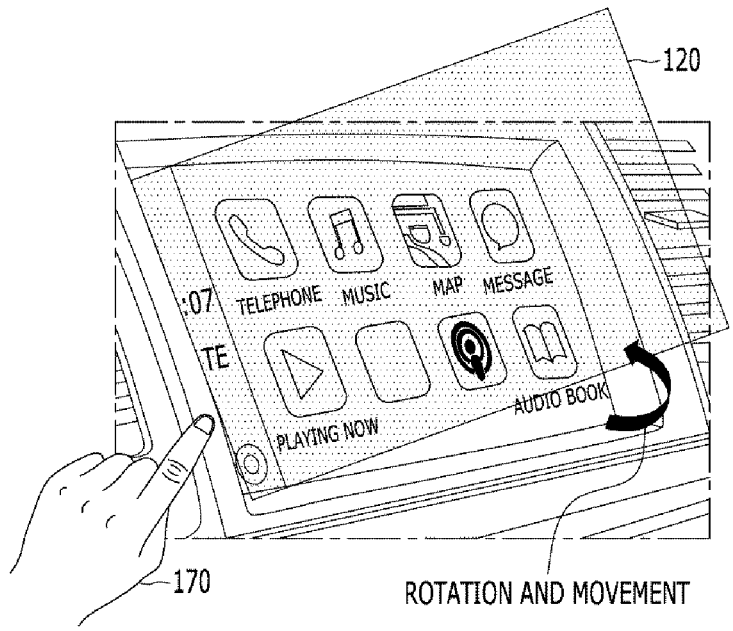

FIGS. 5 and 6 are diagrams for explanation of user input for driving of rotation of a projection unit.

As shown in FIG. 5, the infotainment apparatus may receive user input of a request for rotation of the projection unit 120 from an input switch 162 installed at a steering wheel 160 of a vehicle.

For example, the input switch 162 may be a wheel type switch or an up/down switch, but is not limited thereto.

In addition, when the input switch 162 is the wheel type switch, the infotainment apparatus may recognize the rotation angle of the projection unit 120 depending on a rotation amount of the wheel type switch.

That is, the infotainment apparatus according to the present disclosure may adjust the rotation angle through a rotation hinge of the transparent touch panel that is the projection unit 120 using the input switch 162 installed at the steering wheel 160, may rotate the projection unit 120 through a step motor connected to the rotation hinge, and may recognize the rotation angle of the projection unit 120 through a rotation angle sensor.

The recognized rotation angle of the projection unit 120 may be used when coordinates of a touch region of the projection application icon projected onto the transparent touch panel that is the projection unit 120, and may also be used when a ratio of the application icon displayed on the display screen of the infotainment apparatus is changed in order to normally display the image of the projected projection application icon.

As shown in FIG. 6, upon receiving user input of a request for rotation of the projection unit 120, the infotainment apparatus may also receive the user input from the gesture sensor of the vehicle.

Here, the infotainment apparatus may control the driver to rotate and move the projection unit 120 based on the gesture information received from the gesture sensor.

That is, the infotainment apparatus may control the driver to rotate and move the projection unit 120 when the gesture information received from the gesture sensor is a request for rotation of the projection unit 120, and the infotainment apparatus may control the driver to stop rotation and movement of the projection unit 120 upon receiving a request for stop of rotation of the projection unit 120.

Here, when controlling the driver to stop rotation and movement of the projection unit 120, the infotainment apparatus may control the driver to stop rotation and movement of the projection unit 120 when the screen of the projection unit 120 contacts a predetermined object 170 during rotation and movement of the projection unit 120.

For example, the predetermined object 170 may be a user body, but is not limited thereto.

That is, upon recognizing a hand shape as gesture information indicating a request for rotation of the projection unit 120 through the gesture sensor, the infotainment apparatus may control the step motor that is the driver to rotate the transparent touch panel that is the projection unit 120, and may control the step motor that is the driver to stop rotation of the projection unit 120 when the transparent touch panel that is the projection unit 120 contacts a finger of the driver.

As such, according to the present disclosure, the transparent touch panel that is the projection unit 120 may be rotated only to a position at which the driver finger is positioned, and thus, user convenience may be provided to easily and conveniently control the rotation angle of the projection unit 120.

As necessary, when controlling the driver to stop rotation and movement of the projection unit 120, the infotainment apparatus may control the driver to stop rotation and movement of the projection unit 120 when gesture information received from the gesture sensor is a request for stop of rotation of the projection unit 120.

That is, upon recognizing a hand shape as gesture information indicating a request for rotation of the projection unit 120 through the gesture sensor, the infotainment apparatus may control the step motor that is the driver to rotate the transparent touch panel that is the projection unit 120, and upon recognizing a hand shape as gesture information indicating stop of rotation of the projection unit 120 through the gesture sensor, the infotainment apparatus may control the step motor that is the driver to stop rotation of the projection unit 120.

As such, according to the present disclosure, the transparent touch panel that is the projection unit 120 may be rotated only to an eye point for recognizing gesture information indicating stop of rotation of the projection unit 120, and thus, user convenience may be provided to easily and conveniently control the rotation angle of the projection unit 120.

Figure 7:
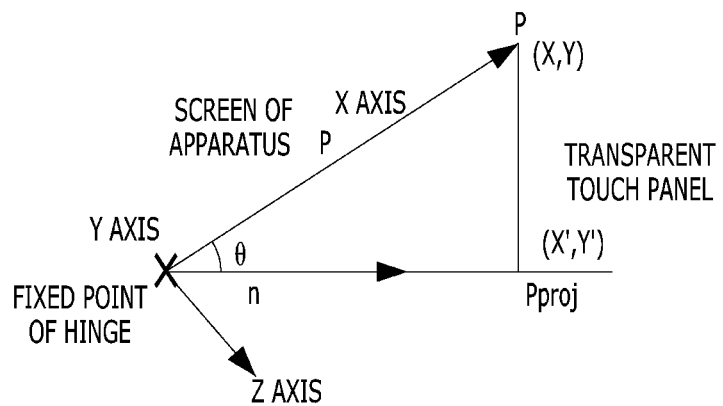
FIGS. 7 and 8 are diagrams for explanation of modification of information of a display screen according to driving of rotation of a projection unit.
Figure 8:
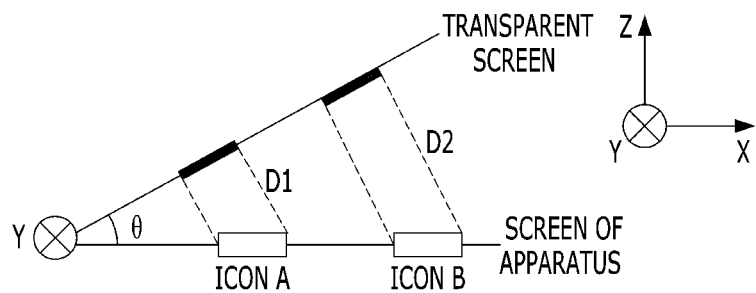

FIGS. 7 and 8 are diagrams for explanation of modification of information of a display screen according to driving of rotation of a projection unit.

As shown in FIG. 7, an infotainment apparatus according to the present disclosure may modify information displayed on the display screen based on a rotation angle of a transparent touch panel that is a projection unit.

Here, the modified information may include an application icon, but the present disclosure is not limited thereto.

That is, the infotainment apparatus may modify at least one of the coordinates and size of information, and the size of a touch region corresponding to the information, but the present disclosure is not limited thereto.

For example, when the information is an application icon, the infotainment apparatus may modify coordinates of the application icon depending on a rotation angle of the transparent touch panel that is the projection unit, may modify the size of the application icon, or may modify the size of the touch region of the application icon.

As necessary, the infotainment apparatus may simultaneously change the coordinates of the application icon, the size of the application icon, and the size of the touch region of the application icon, depending on the rotation angle of the transparent touch panel that is the projection unit.

In addition, the infotainment apparatus may change and increase at least one of the coordinates of the application icon, the size of the application icon, and the size of the touch region of the application icon when the rotation angle of the transparent touch panel is increased.

This is because an application icon formed by projecting the application icon displayed on the display screen onto the transparent touch panel that is the projection unit is not a normal image when the rotation angle of the transparent touch panel is increased in a direction toward a driver or a user.

Accordingly, the infotainment apparatus may modify the size of the application icon, the size of the touch region of the application icon, and the like depending on the rotation angle of the projection unit to display the application icon projected onto the transparent touch panel that is the projection unit as a normal image.

For example, when a rotation axis of the projection unit is the Y axis, the infotainment apparatus may control the display screen to fix the size of the application icon in the Y-axis direction or the size of the touch region of the application icon based on the display screen and to increase the size of the application icon or the size of the touch region of the application icon in the X-axis direction.

In this case, the application icon projected onto the transparent touch panel that is the projection unit may be displayed as a normal image using a visual field of a driver or a user.

As such, the infotainment apparatus may increase or reduce the size of the application icon in the X-axis direction by a ratio of $1/\cos\theta$ depending on the rotation angle of the projection unit.

For example, when the rotation hinge is rotated, a relationship between coordinates X, Y of the application icon displayed on the display screen and coordinates X', Y' of the application icon projected onto the transparent touch panel that is the projection unit may satisfy $X*\cos\theta=X'$ and $Y=Y'$.

That is, it may be possible to change the touch region of the application icon depending on the rotation angle of the projection unit according to the transformation matrix $$T = \begin{pmatrix} \cos\theta & 0 \\ 0 & 1 \end{pmatrix}.$$

Accordingly, a relationship between coordinates X, Y of the application icon displayed on the display screen and coordinates X', Y' of the application icon projected onto the transparent touch panel that is the projection unit may satisfy the following expression.

$$\begin{pmatrix} X' \\ Y' \end{pmatrix} = T \begin{pmatrix} X \\ Y \end{pmatrix}$$

In addition, when the X-axis line of the application icon displayed on the display screen extends in a magnification of $1/\cos\theta$ depending on the rotation angle of the projection unit, component D is 1 in asymptotic matrix P×projection matrix T to check a normal image, according to the following expressions.

$$P = \begin{pmatrix} 1/\cos\theta & 0 \\ 0 & 1 \end{pmatrix},$$

$$T = \begin{pmatrix} \cos\theta & 0 \\ 0 & 1 \end{pmatrix}$$

$$P \times T = \begin{pmatrix} 1 & 0 \\ 0 & 1 \end{pmatrix}$$

Here, when the X-axis line of the result value of P×T extends in a magnification of $1/\cos\theta$, it may be possible to display an image of an application icon projected onto the transparent touch panel that is the projection unit as a normal image.

When the transparent touch panel that is the projection unit is rotated based on the Y axis only, the size and touch region of the application icon may be determined according to a value of $\cos\theta$.

As such, according to the present disclosure, information displayed on the display screen may be modified depending on the rotation angle of the projection unit that is rotated and moved, and thus, the information of the display screen may be projected in a direction toward a driver to enable easy recognition and touch.

According to the present disclosure, an undersized driver may easily execute an application of an infotainment screen during driving.

As shown in FIG. 8, the infotainment apparatus may adjust the brightness of the information displayed on the display screen based on the rotation angle of the projection unit.

Here, when adjusting the brightness of information, the infotainment apparatus may increase the brightness of information displayed on the display screen when the rotation angle of the projection unit is increased.

As necessary, the infotainment apparatus may adjust the brightness of the information displayed on the display screen based on the rotation angle of the projection unit and a distance between the rotation axis of the projection unit and the information displayed on the display screen.

Here, when adjusting the brightness of the information displayed on the display screen, the infotainment apparatus may increase the brightness of the information displayed on the display screen along with an increase in the rotation angle of the projection unit and an increase in the distance between the rotation axis of the projection unit and the information displayed on the display screen.

When the transparent touch panel that is the projection unit is rotated based on the Y axis only, the vertical distance D2 between the application icon B and a screen of the transparent touch panel that is the projection unit may be greater than the vertical distance D1 between the application icon A and the screen of the transparent touch panel that is the projection unit based on a distance by which the application icon A and the application icon B displayed on the display screen are spaced from the center, and thus, brightness of the projection application icon B may be darker than the brightness of the projection application icon A.

Accordingly, according to the present disclosure, the brightness of the application icons displayed on the screen of the display screen may be appropriately adjusted to the changed projection distance depending on the rotation angle of the projection unit, thereby removing sense of difference.

That is, the infotainment apparatus may control the display screen to display the application icon A and the application icon B in such a way that the brightness of the application icon B displayed on the display screen is lighter than the brightness of the application icon A.

Figure 9:
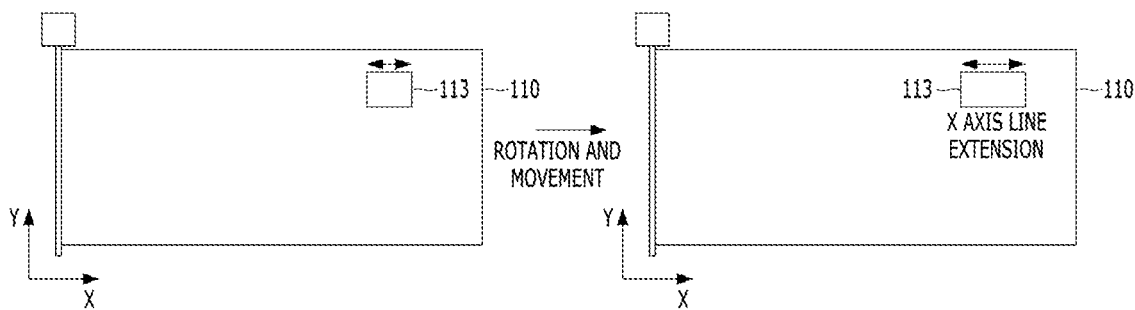
FIGS. 9 and 10 are diagrams for explanation of a method of modifying information of a display screen according to driving of rotation of a projection unit.
Figure 10:
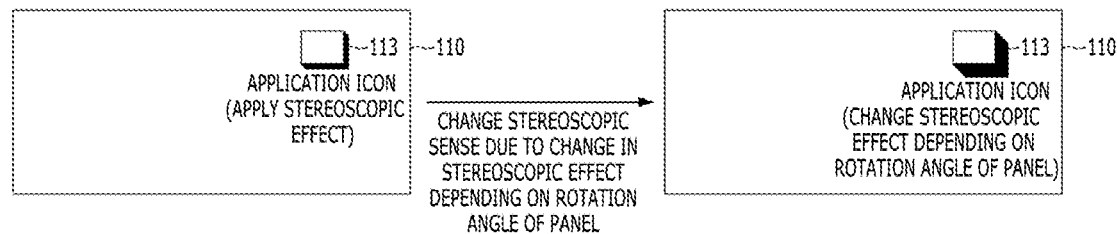

FIGS. 9 and 10 are diagrams for explanation of a method of modifying information of a display screen according to driving of rotation of a projection unit.

As shown in FIG. 9, the infotainment apparatus according to the present disclosure may control the display unit 110 to modify at least one of the coordinates and size of the information 113 and the size of the touch region corresponding to the information 113.

Here, the infotainment apparatus may control the display unit 110 to increase at least one of the size of the information 113 and the size of the touch region corresponding to the information 113 when the rotation angle of the projection unit is increased.

For example, the infotainment apparatus may fix the size of in the Y-axis direction based on the screen of the display unit 110 and may increase the size in the X-axis direction when the rotation of the projection unit is the Y axis and the rotation angle of the projection unit is increased.

That is, the infotainment apparatus may increase the size in the X-axis direction by a ratio of $1/\cos\theta$ when the rotation axis of the projection unit is the Y axis and the rotation angle of the projection unit is increased.

As such, according to the present disclosure, on the transparent touch panel that is the projection unit onto which the application icon displayed on the screen of the display unit 110 is projected, the Y-axis direction line of the projection application icon may be fixed, but the X-axis direction line of the projection application icon may be reduced when the rotation hinge 132 is rotated, and thus, a different shape from an actual application displayed on the screen of the display unit 110 may be displayed.

To correct this, according to the present disclosure, the X-axis line of the application icon displayed on the screen of the display unit 110 may extend in a magnification corresponding to the rotation angle in order to normally recognize the projection application icon, which is formed by projecting the application icon displayed on the screen of the display unit 110 onto the screen by the driver, depending on the rotation angle of the projection unit.

As such, the present disclosure relates to a method of rotating a capacitive touchpad panel depending on a viewing angle of a driver and executing an application when an application image of an infotainment apparatus, projected onto the touchpad panel, is touched.

That is, according to the present disclosure, when the transparent touch panel that is the projection unit of the screen of the infotainment apparatus is rotated by a driver through a step motor or a motor via a switch operation, an icon that is formed by extending the X-axis line of an icon displayed on the screen of the infotainment apparatus in a magnification of $1/\cos\theta$ depending on a rotation angle measured through an angle sensor and is projected onto the transparent touch panel may be normally displayed.

According to the present disclosure, an icon touch region of the touch panel may also be changed according to the projection matrix depending on the rotation angle of the touch panel, and thus, when the driver touches an icon image region recognized by the driver, an application may be executed.

As shown in FIG. 10, the infotainment apparatus may also control the display unit 110 to adjust a stereoscopic effect of the information 113 displayed on the screen of the display unit 110 based on the rotation angle of the projection unit.

Here, when the rotation angle of the projection unit is increased, the infotainment apparatus may control the display unit 110 to increase a stereoscopic effect of the information 113 displayed on the screen of the display unit 110.

As such, according to the present disclosure, a degree of a stereoscopic effect applied to an application icon displayed on the screen of the display unit 110 may be changed depending on the rotation angle of the projection unit, and thus, the projection application icon that is projected onto the screen of the transparent touch panel that is the projection unit may be stereoscopically displayed like 3D effect advertisement.

Accordingly, according to the present disclosure, a degree of a stereoscopic effect applied to an application icon displayed on the display screen may be changed depending on the rotation angle of the transparent touch panel that is the projection unit, and thus, the projection application icon may be stereoscopically displayed according to rotation of the transparent touch panel.

Figure 11A:
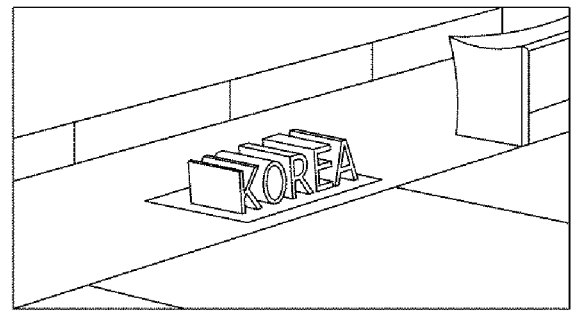
FIGS. 11A to 11C are diagrams showing embodiments of stereoscopic advertisement to which a stereoscopic effect based on a rotation angle of a projection unit is applied.
Figure 11B:
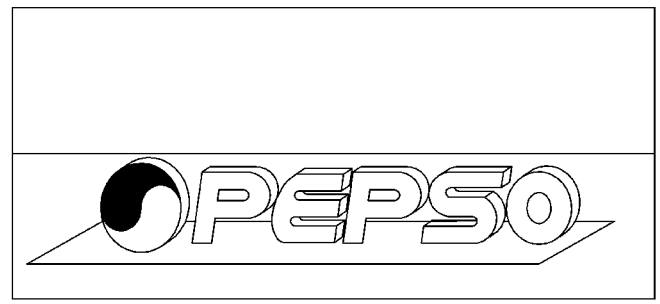
Figure 11C:
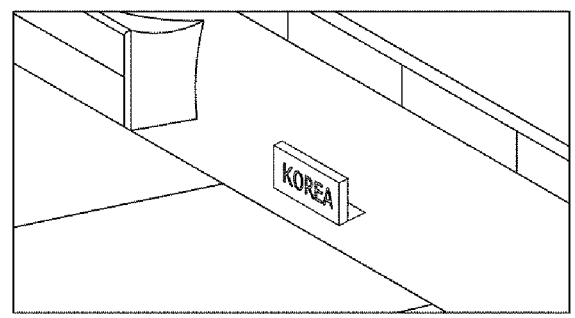

FIGS. 11A to 11C are diagrams showing embodiments of stereoscopic advertisement to which a stereoscopic effect based on a rotation angle of a projection unit is applied.

As shown in FIGS. 11A to 11C, according to the present disclosure, according to user settings, a stereoscopic effect may be applied to an advertising phrase and an advertising image that are displayed on the display screen, and a degree of a stereoscopic effect applied to the advertising phrase and the advertising image may be changed depending on the rotation angle of the projection unit, and thus, stereoscopic advertisement may be projected onto a screen of the transparent touch panel that is the projection unit.

FIG. 11A shows an embodiment in which a stereoscopic effect is applied to an advertising phrase, FIG. 11B shows an embodiment in which a stereoscopic effect is applied to an advertising phrase and an advertising image, and FIG. 11C shows an embodiment in which a stereoscopic effect is applied to an advertising phrase and an advertising image of a billboard or the like.

Figure 12:
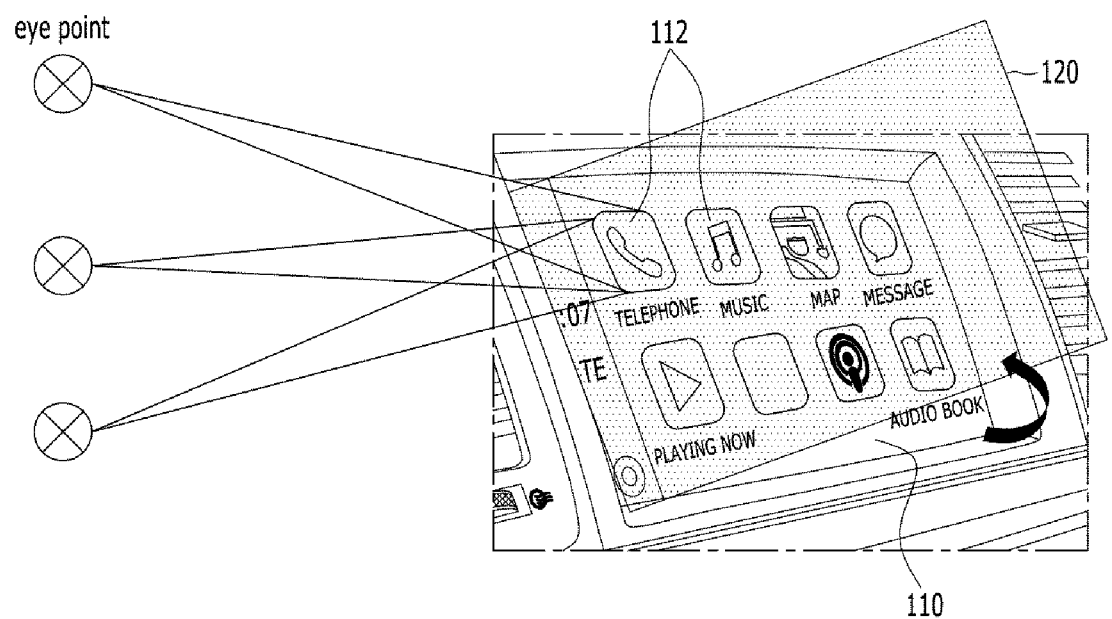
FIG. 12 is a diagram for explanation of a method of modifying information of a display screen depending on a position of a user pupil.

FIG. 12 is a diagram for explanation of a method of modifying information of a display screen depending on a position of a user pupil.

As shown in FIG. 12, the infotainment apparatus according to the present disclosure may control the display unit 110 to extract a user pupil from a user face image captured by the camera and to modify a shape of the application icon 112 based on a position change in the extracted user pupil.

As such, according to the present disclosure, a shape of the application icon 112 may be modified according to a change in an eye point of a driver.

That is, the infotainment apparatus may detect a position change in a pupil from a driver face through a gesture sensor or a camera, and may modify the application icon 112 to stereoscopically display the application icon 112 appropriately to a driver eye point for viewing the application icon 112 projected onto the transparent touch panel that is the projection unit 120 or may modify the application icon 112 to be displayed in a circular shape.

According to the present disclosure, the application icon 112 displayed on the screen of the display unit 110 may be distorted according to a driver eye point to implement a function of causing an optical illusion whereby an application icon projected onto the projection unit 120 is stereoscopically moved according to a change in a driver eye point.

As such, the present disclosure may be implemented using the projection matrix and the eye point transformation matrix for 3D graphic processing in order to differently modify a degree by which the projected application icon is distorted according to the driver eye point.

Figure 13:
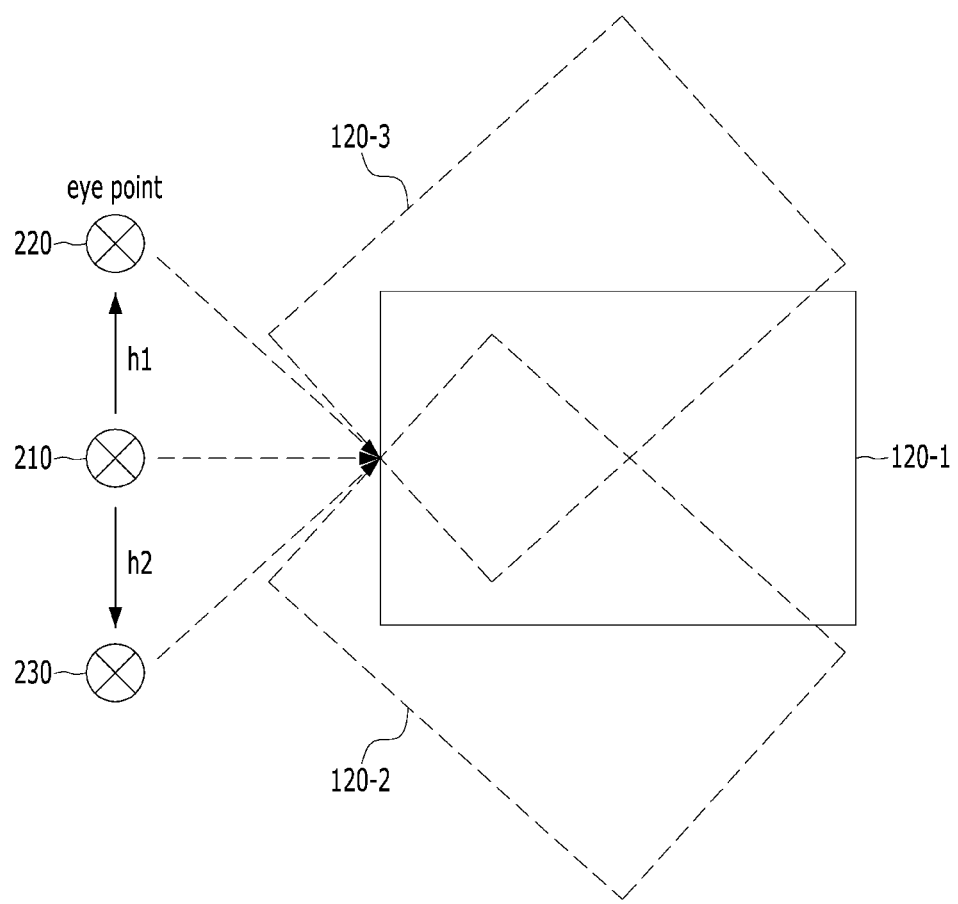
FIG. 13 is a diagram for explanation of rotation and movement of a projection unit depending on a position of an eye point of a user.

FIG. 13 is a diagram for explanation of rotation and movement of a projection unit depending on a position of an eye point of a user.

As shown in FIG. 13, according to the present disclosure, rotation of the projection unit may be controlled to be rotated and moved and to position a length direction of the projection unit in parallel to an extension line that extends from an eye point position based on a user face or user pupil photographed by a camera.

For example, when an eye point based on the user face or user pupil photographed by the camera is positioned at a first eye point position 210, a controller may control rotation of a projection unit 120-1 to be rotated and moved and to position the length direction of the projection unit in parallel to a first extension line that extends from the first eye point position 210.

When an eye point based on the user face or user pupil photographed by the camera is positioned at a second eye point position 220 that is obtained via movement from the first eye point position 210 by a first height h1, the controller may control rotation of a projection unit 120-2 to be rotated and moved and to position the length direction of the projection unit in parallel to a second extension line that extends from the second eye point position 220.

In addition, when an eye point based on the user face or user pupil photographed by the camera is positioned at a third eye point position 230 that is obtained via movement from the first eye point position 210 by a second height h2, the controller may control rotation of a projection unit 120-3 to be rotated and moved and to position the length direction of the projection unit in parallel to a third extension line that extends from the third eye point position 230.

As such, according to the present disclosure, the projection unit may be automatically rotated and moved depending on an eye point position based on a user face or user pupil photographed by a camera.

As necessary, according to the present disclosure, an inquiry message for inquiring of a user about whether rotation and movement of the projection unit are controlled may be displayed on an infotainment screen or a notification message indicating rotation and movement a rotation projection unit may be displayed, based on an eye point position from the user face or user pupil photographed by the camera.

According to the present disclosure, the projection unit may be primarily rotated to be rotated and moved and to position the length direction of the projection unit in parallel to the extension line that extends from an eye point position based on the user face or user pupil photographed by the camera, and the projection unit may be secondarily rotated to be rotated and moved and to perpendicularly position a projection screen of the projection unit to the extension line that extends from the eye point position from the user face or user pupil photographed by the camera.

According to the present disclosure, a shape of an application icon displayed on a display screen of an infotainment apparatus may be varied in consideration of rotation of the projection unit.

As such, according to the present disclosure, rotation and movement of the projection unit may be controlled based on an eye point position from the user face or user pupil photographed by the camera, and thus, convenience may be provided to optimally view a projection screen of the projection unit depending on various physical conditions of a user.

FIG. 14 is a flowchart for explanation of a method of controlling a vehicular infotainment apparatus according to embodiments of the present disclosure.

As shown in FIG. 14, according to the present disclosure, first, information may be displayed on a display screen.

According to the present disclosure, whether user input of a request for rotation of a projection unit is received may be checked.

Here, according to the present disclosure, during checking of whether the user input of the request for rotation of the projection unit is received, the user input may be received from an input switch installed at a steering wheel of a vehicle.

As necessary, according to the present disclosure, during checking of whether the user input of the request for rotation of the projection unit is received, the user input may also be received from a gesture sensor of a vehicle.

Then, according to the present disclosure, then, when the user input is received, the projection unit may be rotated and moved at a rotation angle corresponding to a request for rotation.

Here, according to the present disclosure, during rotation and movement of the projection unit, rotation angle information may be extracted from the user input, and the projection unit may be rotated and moved based on the extracted rotation angle information.

For example, according to the present disclosure, duration extraction of rotation angle information from user input, when the user input is received from an input switch installed at a steering wheel of a vehicle, the rotation angle information may be extracted based on a rotation degree of the input switch, included in the user input.

As another example, according to the present disclosure, during extraction of rotation angle information from user input, when the user input is received from a gesture sensor of a vehicle, the rotation angle information may be extracted based on gesture information included in the user input.

According to the present disclosure, during rotation and movement of the projection unit, when user input is a request for rotation of the projection unit, the projection unit may be rotated and moved, and when the user input is a request for stop of rotation of the projection unit, rotation and movement of the projection unit may be stopped.

Here, according to the present disclosure, when rotation and movement of the projection unit are stopped, the user input is input indicating that the screen of the projection unit contacts a predetermined object during rotation and movement of the projection unit, rotation and movement of the projection unit may be stopped.

For example, the predetermined object may be a user body, but is not limited thereto.

As necessary, according to the present disclosure, when rotation and movement of the projection unit are stopped, if the user input is gesture information for stop of rotation of the projection unit, rotation and movement of the projection unit may be stopped.

Then, according to the present disclosure, information displayed on a screen of a display unit may be modified depending on the rotation angle of the rotated and moved projection unit.

Here, according to the present disclosure, when information displayed on the screen of the display unit is modified, information including an application icon may be modified.

According to the present disclosure, when information displayed on the screen of the display unit is modified, the rotation angle of the rotated and moved projection unit may be sensed, and at least one of the coordinates and size of information and the size of a touch region corresponding to the information may be modified based on the sensed rotation angle.

In this case, according to the present disclosure, when at least one of the coordinates and size of information and the size of a touch region corresponding to the information is modified, if the rotation angle of the projection unit is increased, at least one of the size of the information and the size of the touch region corresponding to the information may be increased.

For example, according to the present disclosure, when at least one of the coordinates and size of the information and the size of the touch region corresponding to the information is modified, if a rotation axis of the projection unit is the Y axis and the rotation angle of the projection unit is increased, the size in the Y-axis direction may be fixed and the size in the X-axis direction may be increased based on the screen of the display unit.

That is, according to the present disclosure, when modifying at least one of the coordinates and size of the information and the size of the touch region corresponding to the information, the rotation axis of the projection unit is the Y axis and the rotation angle of the projection unit is increased, the size may be increased in the X-axis direction by a ratio of $1/\cos\theta$.

As necessary, according to the present disclosure, when information displayed on the screen of the display unit is modified, the brightness of information may also be adjusted based on the rotation angle.

Here, according to the present disclosure, when the brightness of information is adjusted, if the rotation angle is increased, the brightness of the information may be increased.

As another case, according to the present disclosure, when information displayed on the screen of the display unit is modified, the brightness of the information may be adjusted between the rotation angle and a distance between the rotation axis of the projection unit and the information.

Here, according to the present disclosure, when the brightness of information is adjusted, the brightness of the information may be increased along with an increase in the rotation angle and an increase in the distance between the rotation axis of the projection unit and the information.

As another case, according to the present disclosure, when the information displayed on the screen of the display unit is modified, a stereoscopic effect of information may also be adjusted based on the rotation angle.

Here, according to the present disclosure, during adjustment of the stereoscopic effect of the information, when the rotation angle is increased, the stereoscopic effect of the information may be increased.

As another example, according to the present disclosure, when information displayed on the screen of the display unit is modified, a shape of the information may be modified based on a position change of a user pupil.

As such, according to the present disclosure, the information displayed on the display screen may be modified according to the rotation angle of the rotated and moved projection unit, and thus, the display screen may be projected in a direction toward a driver to enable easy recognition and touch of the driver.

According to the present disclosure, an undersized driver may easily execute an application of an infotainment screen during driving.

According to the present disclosure, the application icon may be stereoscopically displayed to enhance visibility, and a customer commercial value may be enhanced in terms of a stereoscopic icon design.

As such, the present disclosure relates to a method of rotating a capacitive touchpad panel depending on a viewing angle of a driver and executing an application when an application image of an infotainment apparatus, projected onto the touchpad panel, is touched.

That is, according to the present disclosure, when the transparent touch panel that is the projection unit of the screen of the infotainment apparatus is rotated by a driver through a step motor or a motor via a switch operation, an icon that is formed by extending the X-axis line of an icon displayed on the screen of the infotainment apparatus in a magnification of $1/\cos\theta$ depending on a rotation angle measured through an angle sensor and is projected onto the transparent touch panel may be normally displayed.

According to the present disclosure, an icon touch region of the touch panel may also be changed according to the projection matrix depending on the rotation angle of the touch panel, and thus, when the driver touches an icon image region recognized by the driver, an application may be executed.

According to the present disclosure, a degree of a stereoscopic effect applied to an application icon displayed on the infotainment apparatus may be changed depending on the rotation angle of the transparent touch panel that is the projection unit, and thus, the icon may be stereoscopically displayed along with rotation of the transparent touch panel.

The present disclosure may perform procedures provided by a method of controlling a vehicular infotainment apparatus using a computer readable recording medium having recorded thereon a program for executing the method of controlling a vehicular infotainment apparatus.

A vehicle according to embodiments of the present disclosure may include a display unit for displaying information on a screen, a projection unit that is distributed on the screen of the display unit to be rotated and moved and projects information displayed on the screen of the display unit, a driver for rotating the projection unit, an infotainment apparatus including a controller for controlling the display unit and the driver, and an input apparatus for receiving user input for driving the infotainment apparatus, and upon receiving user input of a request for rotation of the projection unit, the infotainment apparatus may control the driver to rotate and move the projection unit at the rotation angle corresponding to the user input, and may control the display unit to modify information displayed on the screen of the display unit depending on the rotation angle of the rotated and moved projection unit.

As such, the present disclosure relates to a method in which a touch panel of an infotainment apparatus installed in a vehicle is rotatably configured in a direction toward a driver, and an application is executed by pushing an application icon output to a screen of the infotainment apparatus using a rotated touch panel.

To this end, the present disclosure relates to a method in which coordinates for application recognition of a touch panel need to be changed depending on a rotation angle of a touch panel and a ratio of an icon image displayed on the screen of the apparatus is adjusted to normally display an application icon projected onto a panel according to rotation of the touch panel.

The present disclosure includes a method of stereoscopically displaying an icon image projected onto a panel through a stereoscopic effect applied to an icon image displayed on a screen of an apparatus.

The above configured vehicular infotainment apparatus, a method of controlling the same, and a vehicle including the same related to at least one embodiment of the present disclosure may modify information displayed on a display screen depending on a rotation angle of a rotated and moved projection unit, and thus, a display screen may be projected in a direction toward the driver to enable easy recognition and touch of the driver.

According to the present disclosure, an undersized driver may easily execute an application of an infotainment screen during driving.

According to the present disclosure, the application icon may be stereoscopically displayed to enhance visibility, and a customer commercial value may be enhanced in terms of a stereoscopic icon design.

As such, the present disclosure relates to a method of rotating a capacitive touchpad panel depending on a viewing angle of a driver and executing an application when an application image of an infotainment apparatus, projected onto the touchpad panel, is touched.

That is, according to the present disclosure, when the transparent touch panel that is the projection unit of the screen of the infotainment apparatus is rotated by a driver through a step motor or a motor via a switch operation, an icon that is formed by extending the X-axis line of an icon displayed on the screen of the infotainment apparatus in a magnification of 1/cosθ depending on a rotation angle measured through an angle sensor and is projected onto the transparent touch panel may be normally displayed.

According to the present disclosure, an icon touch region of the touch panel may also be changed according to the projection matrix depending on the rotation angle of the touch panel, and thus, when the driver touches an icon image region recognized by the driver, an application may be executed.

According to the present disclosure, a degree of a stereoscopic effect applied to an application icon displayed on the infotainment apparatus may be changed depending on the rotation angle of the transparent touch panel that is the projection unit, and thus, the icon may be stereoscopically displayed along with rotation of the transparent touch panel.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the disclosures. Thus, it is intended that the present disclosure cover the modifications and variations of this disclosure provided they come within the scope of the appended claims and their equivalents.

What is claimed is:

1. A vehicular infotainment apparatus comprising:
   a display unit configured to display information on a screen;
   a projection unit disposed proximate to the screen of the display unit, the projection unit being rotatable, movable, and configured to project the information displayed on the screen of the display unit;
   a driver configured to rotate and move the projection unit; and
   a controller configured to control operation of the display unit and the driver and to receive a request for rotation of the projection unit,
   wherein the controller is further configured to control the operation of the driver such that the driver causes the projection unit to rotate or move at a rotation angle corresponding to the request for rotation of the projection unit and to control the operation of the display unit such that the display unit modifies the information displayed on the screen of the display unit according to the rotation angle of the projection unit.

2. The vehicular infotainment apparatus of claim 1, wherein the projection unit includes a transparent touch panel.

3. The vehicular infotainment apparatus of claim 1, wherein the driver includes:
   a rotation hinge disposed to one side of the projection unit and configured to rotate the projection unit; and
   a motor configured to rotate the rotation hinge according to a control signal of the controller.

4. The vehicular infotainment apparatus of claim 1, further comprising a rotation angle sensor configured to sense the rotation angle of the projection unit.

5. The vehicular infotainment apparatus of claim 4, wherein the controller is configured to receive the sensed rotation angle from the rotation angle sensor and to control the operation of the display unit such that the display unit modifies the information displayed on the screen of the display unit based on the rotation angle received from the rotation angle sensor.

6. The vehicular infotainment apparatus of claim 1, further comprising a gesture sensor configured to sense a gesture of a user.

7. The vehicular infotainment apparatus of claim 6, wherein the controller is configured to receive gesture information from the gesture sensor and to control the driver such that the driver rotates or moves the projection unit based on the gesture information received from the gesture sensor.

8. The vehicular infotainment apparatus of claim 1, further comprising a camera configured to acquire an image of a user face.

9. The vehicular infotainment apparatus of claim 8, wherein the controller is configured to control the operation of the display unit such that the display unit extracts a user pupil from the image of the user face acquired by the camera and modifies a shape of the information displayed on the screen of the display unit based on a position change of the extracted user pupil.

10. The vehicular infotainment apparatus of claim 1, wherein the controller is configured to extract rotation angle information from the request for rotation of the projection unit and to control the operation of the driver such that the driver causes the projection unit to rotate or move based on the extracted rotation angle information.

11. The vehicular infotainment apparatus of claim 1, wherein the controller is configured to control the operation of the display unit such that the display unit modifies at least one of coordinates and a size of the information displayed on the screen of the display unit and a size of a touch region corresponding to the information displayed on the screen of the display unit.

12. The vehicular infotainment apparatus of claim 1, wherein the controller is configured to control operation of the display unit such that the display unit adjusts a brightness of the information displayed on the screen of the display unit based on the rotation angle of the projection unit and a distance between a rotation axis of the projection unit and the information displayed on the screen of the display unit.

13. The vehicular infotainment apparatus of claim 1, wherein the controller is configured to control the operation of the display unit such that the display unit adjusts a stereoscopic effect of the information displayed on the screen of the display unit based on the rotation angle of the projection unit.

14. The vehicular infotainment apparatus of claim 1, wherein the controller is configured to control the operation of the display unit such that the display unit modifies a shape of the information displayed on the screen of the display unit based on a position change of a user pupil.

15. A method of controlling a vehicular infotainment apparatus including a projection unit disposed proximate to a screen of a display unit that is rotatable, movable, and configured to project information displayed on the screen of the display unit, the method comprising:
 displaying information on the screen of the display unit;
 receiving, by a controller, a request for rotation of the projection unit;
 upon receiving the request for rotation of the projection unit, controlling, by the controller, operation of a driver such that the driver causes the projection unit to rotate or move at a rotation angle corresponding to the request for rotation of the projection unit; and
 controlling, by the controller, operation of the display unit such that the display unit modifies the information displayed on the screen of the display unit according to the rotation angle of the projection unit.

16. The method of claim 15, wherein the controlling of the operation of the driver comprises:
 extracting, by the controller, rotation angle information from the request for rotation of the projection unit; and
 controlling, by the controller, the operation of the driver such that the driver rotates or moves the projection unit based on the extracted rotation angle information.

17. The method of claim 15, wherein the controlling of the operation of the display unit comprises:
 sensing a rotation angle of the projection unit; and
 controlling, by the controller, the operation of the display unit such that the display unit modifies at least one of coordinates and a size of the information displayed on the screen of the display unit and a size of a touch region corresponding to the information displayed on the screen of the display unit based on the sensed rotation angle of the projection unit.

18. The method of claim 15, wherein the controlling of the operation of the display unit comprises:
 controlling, by the controller, the operation of the display unit such that the display unit adjusts a brightness of the information displayed on the screen of the display unit based on the rotation angle of the projection unit and a distance between a rotation axis of the projection unit and the information displayed on the screen of the display unit.

19. The method of claim 15, wherein the controlling of the operation of the display unit comprises:
 controlling, by the controller, the operation of the display unit such that the display unit adjusts a stereoscopic effect of the information displayed on the screen of the display unit based on the rotation angle of the projection unit.

20. The method of claim 15, wherein the controlling of the operation of the display unit comprises:
 controlling, by the controller, the operation of the display unit such that the display unit modifies a shape of the information displayed on the screen of the display unit based on a position change of a user pupil.

\* \* \* \* \*